Patented Feb. 10, 1942

2,272,480

UNITED STATES PATENT OFFICE 2,272,480

ELECTRIC INSULATING MATERIAL

Frank H. Riddle, Detroit, Mich., assignor, by mesne assignments, to Champion Spark Plug Company, Toledo, Ohio, a corporation of Delaware (1938)

No Drawing. Application November 16, 1937, Serial No. 174,827

8 Claims. (Cl. 106—46)

This invention relates to an electric insulating material, and more particularly to a ceramic insulator composed principally of MgO. Such insulators have the desirable qualities of relatively high heat expansion, closely approaching the metal parts of a spark plug and particularly the electrode materials, and high electrical resistivity even at elevated temperatures, but are so refractory as to be difficult to fire to form a nonporous structure, and normally have low mechanical strength and low resistance to heat shock.

The purpose of the invention is to produce an insulating material of this character which will have satisfactory mechanical strength and resistance to heat shock, and a sufficiently low maturing point to be fired at commercial temperatures as low as 2500° F. while still retaining the desirable characteristics of the major ingredient.

The maturing point may be lowered by the use of fluxes in common use in the ceramic art, but if ordinary fluxes are added in sufficient quantities to bring the maturing temperature within readily feasible commercial range, they affect injuriously the structure, character and physical and electrical properties of the insulating body.

Many different materials and combinations of materials have been tried in an effort to find some way in which the maturing point of an MgO body could be lowered and a desirably compact and dense body formed without the production of an objectionable amount or type of glass or otherwise injuriously affecting the resultant product. It has been found that the addition to the MgO of a relatively small amount of a mixture of beryl and titanium oxide produces a desirable and unique effect.

A combination of beryl and titanium oxide acts as a mineralizer and lowers the maturing point of the mixture more than either one alone, and likewise increases the mechanical strength and the resistance to heat shock more than either material alone. The last mentioned quality is particularly important where the insulator is to be used in places where it is subjected to sudden and violent changes in temperature, as in spark plugs, for example. The proportions of beryl and titanium oxide to each other may be varied. The preferred proportions are substantially equal proportions of the two materials, but markedly improved results may be obtained by using a mixture of these materials having as high a ratio as 3 to 1 of either ingredient to the other.

The readily available magnesium oxide is generally impure, containing small amounts of various impurities, principally lime, silica and alumina. These impurities altogether amount to from 2½% to 5% of most of the materials readily available and classed as substantially pure magnesia. A good grade of brucite, for example, contains about 5% of such impurities.

Of these usual impurities, the lime is the most objectionable. While materials containing as much as 4% of lime may be employed with some success, the results are more satisfactory if less lime is present. Ordinarily, materials are chosen which contain not more than 2½% lime, and still better results are obtained by materials containing less than 1% lime.

With these commercial grades classed as substantially pure magnesia, good results have been obtained by an admixture of about 5% of the beryl and titanium oxide mixture. An appreciable improvement is secured by as little as 2% or 3% and for some purposes as high as 10% may be desirable.

It will be seen that, depending upon the amount of natural impurities and the purposes of the addition of the mineralizing mixture, the resultant body will contain from 85% to 95% magnesia.

The magnesia may be obtained from any readily available source. For example, electrically fused magnesia or brucite or magnesite may be employed. While different sources of magnesia may be used, calcined brucite is preferred. In preparing the batch for forming, the ingredients may be mixed in any desired order and may be calcined or fused separately or in any desired combination.

The essential ingredient in the beryl is believed to be the beryllium oxide. In the beryl employed, the ingredients are approximately 14% BeO, 19% $Al_2O_3$ and 67% $SiO_2$, which is an approximation to the formula $2BeO, Al_2O_3.6SiO_2$. If some other source of beryllium oxide is utilized appropriate quantities may be employed to produce approximately a similar amount of the desired ingredient. Similarly, if the rutile or other source of titanium oxide utilized contains other ingredients or impurities, allowance should be made for such impurities. Titanium constitutes about 60% of titanium oxide, while beryllium constitutes only about 4% of beryl. Accordingly, when calculated on the basis of the metals the proportions of Be to Ti should be from 1 to 45 to 1 to 5.

A body formed from so-called pure magnesia of the kind described, actually containing from 95% to 97% MgO, matures at around cone 32 or 33, though the maturing point may be varied by many well known influences.

Beryl and titanium oxide mixed half and half and together constituting about 5% of the body reduces its maturing point from cone 32 or above to around cone 15. A given amount of titanium oxide is more effective in lowering the maturing point than is a like amount of beryl, but when the two ingredients are mixed the effect in lowering the maturing point is about the same as though the same amount of titanium oxide were used alone.

As previously indicated, the mechanical strength and resistance to heat shock are likewise increased by the addition of a mixture of beryl and titanium oxide or their equivalent.

It will be seen from the foregoing that an insulating body such as is defined in the appended claims has unique characteristics and accomplishes the purposes of this invention.

What is claimed is:

1. An insulating body consisting of brucite with its natural impurities, said impurities being essentially CaO, Al$_2$O$_3$ and SiO$_2$ and together constituting about 5% of the body, and a mixture of beryl and titanium oxide constituting from 2% to 10% of the body, the beryl and titanium oxide in the mixture being in proportions not greater than three of one to one of the other.

2. An insulating body at least 90% of which consists of a mixture of MgO with from 2% to 10% of a mixture of a beryllium compound and a titanium compound, said compounds being proportioned to make the beryllium and titanium, calculated as metals, between 1 to 45 and 1 to 5.

3. An insulating body consisting of approximately 90% MgO, 5% of a mixture of beryl and titanium oxide, and the remaining 5% of oxides of calcium, aluminum and silica, the beryl and titanium oxide in the mixture being in proportions not greater than three of one to one of the other.

4. An insulating body in accordance with claim 3, and in which the beryl and titanium are substantially equal in quantity.

5. An insulating body in accordance with claim 3 and in which the calcium oxide constitutes not more than 2½% of the body.

6. An insulating body in accordance with claim 3 and in which the calcium oxide constitutes not more than 1% of the body.

7. An insulating body at least 90% of which consists of a mixture of MgO with from 2% to 10% of a mixture of beryl and titanium oxides and the remainder of refractory oxides, the mixture of beryl and titanium oxide being in proportions not greater than three of one to one of the other.

8. An insulating body at least 90% of which consists of a mixture of MgO with from 2% to 10% of a mixture of beryl and titanium oxides and the remainder of refractory oxides, the beryl and titanium oxide being in approximately equal proportions.

FRANK H. RIDDLE.